Sept. 12, 1950   K. A. OPLINGER ET AL   2,521,865
THERMALLY RESPONSIVE ELECTRICAL DEVICE
Filed Feb. 24, 1947

WITNESSES:
E. G. McCloskey
Nw. L. Groome

INVENTORS
Kirk A. Oplinger and
Stephen Sentipal.
BY C. L. Freedman
ATTORNEY

Patented Sept. 12, 1950

2,521,865

UNITED STATES PATENT OFFICE 2,521,865

THERMALLY RESPONSIVE ELECTRICAL DEVICE

Kirk A. Oplinger, Verona, and Stephen Sentipal, East McKeesport, Pa., assignors to Westinghouse Electric Corporation, East Pittsburgh, Pa., a corporation of Pennsylvania Application February 24, 1947, Serial No. 730,430

8 Claims. (Cl. 297—12)

1

This invention relates to a thermally-responsive device and it has particular relation to thermal devices which are directionally responsive to the product of two variable quantities, such as the voltage and current of an electrical circuit.

Thermally-responsive devices are employed in the prior art for various purposes, such as for relaying and measuring. As shown in the Johnson Patent No. 2,323,776, thermally-responsive devices may be employed as directional relays. Depending upon the connection employed, the thermally-responsive relays may be designed to respond to the direction of flow of either real or reactive power. In addition, thermally-responsive devices are often employed for measuring the power or power demand of an electrical circuit. A device suitable for such measurements is disclosed in the Vassar Patent No. 2,323,738. Such an instrument may measure real or reactive power.

In accordance with the invention, a thermally-responsive device is provided which is of sturdy construction and which is substantially free of friction. The invention contemplates the utilization of a plurality of thermomotive elements which preferably are of the multi-metallic type. A thermomotive element may be defined as an element which, in response to a change of the temperature thereof, has one part which deflects or moves with respect to another part thereof. Multi-metallic elements are constructed of two or more layers of material which have different temperature coefficients of expansion. The most common form of a multi-metallic element consists of two layers and is known as a bimetallic element. However, three or more layers may be employed, depending upon the characteristics desired.

In a preferred embodiment of the invention, four multi-metallic elements are disposed substantially in a common plane and in side-by-side relationship. Adjacent ends of the elements are electrically connected to provide two pairs of series-connected elements. The free ends of the elements are mechanically secured to each other and to a suitable support. By suitably energizing the elements from a source of electrical energy, the elements are subjected to stresses which tend to move the series-connected ends in opposite directions. The elements are preferably symmetrically arranged with reference to an axis which passes through suitable translating means and may be designed to produce a resultant force passing through the axis. Under such conditions, the resultant force does not produce a couple about the axis and no twisting of the elements about the axis results.

2

The translating means may comprise a pointer and scale which are designed to measure the deflections of the thermomotive elements for the purpose of indicating the magnitude of the energization of the elements. Alternatively, the means may include electrical contacts which are actuated in response to variations in the energization of the thermomotive elements for the purpose of operating suitable electrical apparatus.

It is, therefore, an object of the invention to provide an improved thermally-responsive device capable of developing a resultant force which does not exert a couple about a predetermined axis.

It is a further object of the invention to provide a thermally-responsive device wherein four thermomotive elements are disposed in a common plane substantially in side-by-side relationship and having adjacent ends electrically connected to provide two series-connected pairs of elements.

Other objects of the invention will be apparent from the description taken in conjunction with the drawing, in which.

Figure 1:
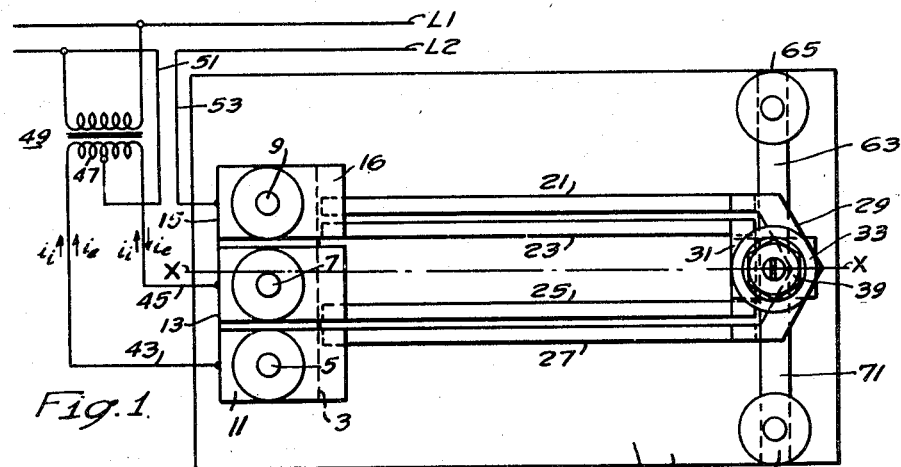
Figure 1 is a top plan view of a thermally-responsive device embodying the invention with certain electrical connections schematically shown.

Referring to the drawing, Figure 1 shows a thermally-responsive device having a base 1 constructed of a suitable insulating material. The base 1 has a pedestal 3 mounted thereon and constructed of an insulating material. The base and pedestal may be molded from a phenolic resin. Three parallel electroconductive machine screws 5, 7 and 9 pass through the base and pedestal for the purpose of securing to the pedestal 3 electroconductive plates 11, 13 and 15. Nuts 17 may be employed in association with the screws for securing the plates to the pedestal and base. Thumb nuts 19 are also provided for the machine screws to permit utilization of the machine screws as terminals or binding posts.

The plates 11, 13 and 15 have secured thereto, by welding or otherwise, four thermomotive elements 21, 23, 25 and 27. As shown in Figure 1, plate 15 projects beyond the pedestal 3 for the purpose of providing an overhanging lip 16 to which the elements 21 and 23 are secured. In a somewhat similar manner, the element 25 is secured to the plate 13 and the element 27 is secured to the plate 11. At their free ends the elements 21 and 27 are electrically and mechanically connected in series by means of an electroconductive bridge 29. In a somewhat similar manner, the elements 23 and 25 are connected together by a bridge 21. The bridges may be constructed of steel which is welded or otherwise suitably secured to the associated elements.

The elements 21, 23, 25 and 27 preferably are multi-metallic elements. As shown more clearly in Fig. 2, the elements are formed of two laminations or layers $a$ and $b$ which are secured to form a bimetallic element in a manner well known in the art. For the purpose of illustration, it will be assumed that the lamination $b$ has a larger temperature coefficient of expansion than that of the lamination $a$. As noted in Fig. 2, the laminations $b$ of the elements 21 and 27 are located below the laminations $a$. Consequently, as the elements are heated they tend to deflect the bridge 29 in an upward direction away from the base 1.

Figure 2:
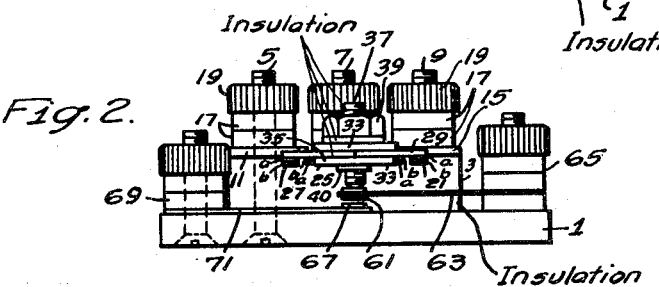
Fig. 2 is a view in end elevation of the thermally-responsive device shown in Fig. 1.

By inspection of Fig. 2, it will be observed that the elements 23 and 25 have their laminations $a$ below their laminations $b$. Consequently, when these laminations are heated, they tend to deflect their associated bridge 31 toward the base 1.

The two bridges 29 and 31 are mechanically connected to each other but are electrically insulated from each other. Two insulating washers 33 and 35 are disposed on opposite sides of the two bridges and screw 37 passes through the washers and between the bridges. The screw may be constructed of insulating material or it may pass through a tube (not shown) of insulating material. Nuts 39 and 40 may be associated with the screw for securing the washers 33 and 35 together with the bridges 29 and 31 therebetween.

Since the bridges 29 and 31 are mechanically connected to each other, it follows that they must deflect as a unit in response to a change in the energization of the thermomotive elements. It will be recalled that the stress developed by the thermomotive elements 21 and 27 opposes that developed by the elements 23 and 25. Since the elements are similar in construction and shape, it follows that variations in ambient temperature have substantially no effect on the thermally-responsive device.

In order to explain briefly the procedure for energizing the thermomotive elements, it will be assumed that the thermally-responsive device is associated with a circuit comprising the conductors L1 and L2 for the purpose of responding to the flow of power in the circuit. The plates 11 and 13 are connected respectively through conductors 43 and 45 to the terminals of the secondary winding 47 of a voltage transformer 49. The primary winding of the voltage transformer is connected across the conductors L1 and L2. The device is also energized in accordance with current flowing through the conductor L2 by means of conductors 51 and 53 which are connected respectively to a center tap on the secondary winding 47 and to the plate 15.

Although the circuit with which the device is associated may be any desired alternating-current circuit, it may be assumed for the purpose of discussion that it is a single-phase, alternating-current circuit operating at a frequency of 60 cycles per second. Let it be assumed that for normal conditions of power flow, the voltage transformer 49 supplies to the device a current component $i_e$. Let it be assumed further that current flowing through the conductor L2 divides between the conductors 43 and 45 equally, to provide current components $i_1$ therein. The arrows represent instantaneous directions of current flow. By inspection of Figure 1, it will be observed that the thermomotive elements 21 and 27 are energized in accordance with the sum of the components $i_e+i_1$, whereas the thermomotive elements 23 and 25 are energized in accordance with the difference between the current components $i_e-i_1$. Since the resultant current flowing through the elements 21 and 27 is larger than the resultant current flowing through the elements 23 and 25, the resistance losses in the former are greater than those in the latter elements. Consequently, the temperatures of the elements 21 and 27 are higher than those of elements 23 and 25 and the stresses applied by the elements 21 and 27 to the bridge 29 exceed those applied by the elements 23 and 25 to the bridge 31. Consequently, in response to an increase in such energization, the bridges move away from the base 1 until a position of equilibrium is reached.

Let it be assumed next that the direction of power flow in the circuit represented by the conductors L1 and L2 reverses. This may be represented by assuming that the current components $i_1$, shown in Figure 1, reverse in direction. Such a reversal produces an alternating-current flow through the elements 21 and 27 which is equal to the difference between the components $i_e-i_1$, whereas the alternating flow through the elements 23 and 25 is equal to the sum of the components $i_e+i_1$. The stresses developed by the elements 23 and 25 consequently exceed those developed by the elements 21 and 27 and the bridges 29 and 31 are moved towards the base 1 until a new position of equilibrium is reached.

If the movement of the bridges relative to the base 1 is measured by suitable translating means, such as a scale and pointer, it will be found that the direction of movement of the bridges from the positions they occupy when the elements are unenergized is dependent upon the direction of power flow in the associated circuit. The extent of the movement is dependent on the magnitude of the aforesaid power flow. If the voltage applied to the primary winding of the transformer 49 is in phase with that across the conductors L1 and L2, the movement of the bridges is dependent on the real power flowing in the associated circuit. If the voltage applied to the primary winding of the transformer 49 is in quadrature with the voltage across the conductors L1 and L2, the movement of the bridges depends upon the flow of the reactive power in the associated circuit.

Movement of the screw 37 may be employed for actuating translating means suitable for controlling any desired electrical apparatus. To this end, a movable contact 61 is secured through an electroconductive spring 63 to a terminal or binding post 65 which may be secured to the base 1. A stationary contact 67 is secured to the base 1 by means of a terminal or binding post 69 and an electroconductive strip 71. The spring 63 biases the contact 61 away from the contact 67. By inspection of Fig. 2, it will be observed that when the screw 37 is deflected toward the base 1 it engages the contact 61 and moves the contact 61 into engagement with the contact 67. Such movement closes a circuit connected to the binding posts 65 and 69. Consequently, the device of Figure 1 and Fig. 2 constitutes a directional relay which closes its contacts in response to a reversal of power flow in the associated circuit.

The elements 23 and 25 preferably are spaced apart by a substantial distance in order to assure operation of all elements at the same temperature when they are energized only by the component $i_e$. It will be noted that the elements are symmetrically disposed about an axis X—X which passes through the screw 37. Consequently, the resultant stress of the element always passes through the axis X—X and no couple is developed about the axis. For this reason no undesirable angular movement of the elements about the axis X—X takes place.

Figure 3:
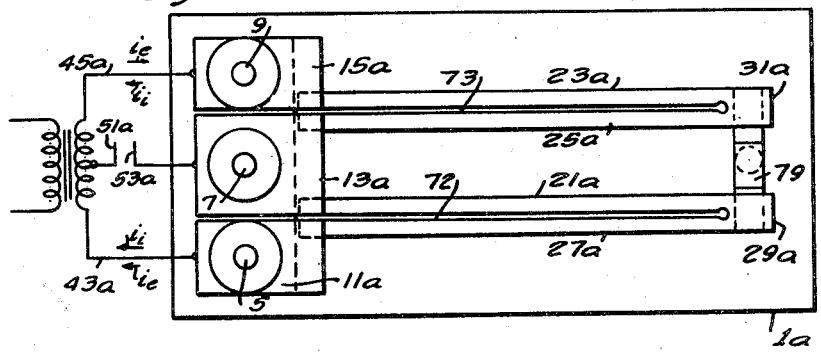
Fig. 3 is a view in top plan of a thermally-responsive device, representing a modified embodiment of the invention and having electrical connections schematically shown.
Figure 4:
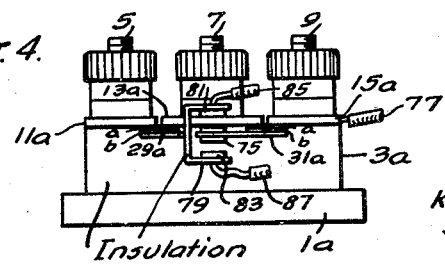
Fig. 4 is a view in end elevation of the thermally-responsive device shown in Fig. 3.

In the embodiment shown in Figs. 3 and 4, a base $1a$ and a pedestal $3a$ are shown, which correspond to the base and pedestal shown in Fig. 1 and which may be similarly constructed. The screws 5, 7 and 9 are employed for attaching electroconductive plates $11a$, $13a$ and $15a$ to the pedestal $3a$ and base $1a$. These plates have welded or otherwise electrically secured thereto four thermomotive elements $21a$, $27a$, $23a$ and $25a$. The element $23a$ is secured to the plate $15a$. The elements $21a$ and $25a$ are connected to the plate $13a$. The element $27a$ is connected to the plate $11a$. The elements $21a$ and $27a$ are electrically and mechanically connected in series by means of a bridge $29a$, whereas the elements $23a$ and $25a$ are electrically and mechanically connected in series by a bridge $31a$. The elements $21a$ and $27a$ and the bridge $29a$ may be formed from a strip of bimetallic material by cutting a slot 72 in the strip. Similarly the elements $23a$ and $25a$, together with the bridge $31a$ may be formed by cutting a slot 73 in a strip of bimetallic material.

As shown in Fig. 4, all elements have a layer $b$ located beneath the layer $a$. Consequently, in response to changes in ambient temperature, all of the elements deflect in the same direction relative to the base $1a$, and the position of the bridge $29a$ relative to the bridge $31a$ remains unchanged. However, if a temperature difference exists between the elements $23a$ and $25a$ on one hand and the elements $21a$ and $27a$ on the other hand, the bridges $29a$ and $31a$ are displaced relative to each other from the relative positions they occupy when the device is deenergized.

For energizing the elements, the secondary winding 47 of the transformer 49 has its terminals connected to the plates $11a$ and $15a$ through conductors $43a$ and $45a$ which correspond respectively to the conductors 43 and 45 of Figure 1. The center tap of the secondary winding 47 and the plate $13a$ are connected to conductors $51a$ and $53a$ which correspond to the conductors 51 and 53 of Figure 1 and which are connected similarly to the associated electrical circuit.

With the connections, as shown in Fig. 3, the current components $i_e$ and $i_1$ may have instantaneous directions of flow similar to those depicted by arrows. With such energization, the elements $21a$ and $27a$ are energized in accordance with the sum of the components $i_e + i_1$, whereas the elements $23a$ and $25a$ are energized in accordance with the difference between the components $i_e - i_1$. Therefore, the temperature of the elements $21a$ and $27a$ is greater than that of the elements $23a$ and $25a$ and the bridge $29a$ is deflected away from the base 1 by a distance substantially greater than that of the bridge $31a$.

If the direction of power in the associated electrical circuit reverses, the elements $23a$ and $25a$ are energized in accordance with the sum of the components $i_e + i_1$ and the elements $21a$ and $27a$ are energized in accordance with the difference between these components. In the last-mentioned case, the bridge $31a$ would be deflected away from the base $1a$ to an extent greater than the deflection of the bridge $29a$ from the base.

If translating means in the form of a pointer and scale were mounted respectively on the bridges $31a$ and $29a$, the direction of deflection of the bridge $29a$ relative to the bridge $31a$ would depend upon the direction of power flow in the associated circuit, and the magnitude of the deflection would depend on the magnitude of the power flow.

The translating means associated with the bridges $29a$ and $31a$ may take the form of a double contact 75 which is secured to the bridge $31a$ in any suitable manner for movement therewith. A conductor 77 may be electrically connected to the contact 75 through the plate $15a$ or otherwise. An insulating fork 79 is secured to the bridge $29a$ in any suitable manner as by rivets (not shown). The fork 79 carries two contacts 81 and 83 positioned in the path of movement of the double contact 75. The contacts 81 and 83 are connected to flexible conductors 85 and 87. If the bridge $31a$ deflects in an upward direction (as viewed in Fig. 4) relative to the bridge $29a$, the contacts 81 and 75 engage to complete a circuit associated with the conductors 77 and 85. Such a circuit may be the tripping circuit of an associated circuit breaker which may be employed to control any desired electrical apparatus. Should the bridge $31a$ move in a downward direction relative to the bridge $29a$, the contacts 75 and 83 engage to complete a circuit associated with the conductors 77 and 87. Consequently, closure of the contacts 75 and 83 may be employed for any desired control operation. From this discussion it is apparent that the device shown in Figs. 3 and 4 is a directional relay which selectively closes either of two pairs of contacts in accordance with the direction of power in an associated electrical circuit. Since the bridges $29a$ and $31a$ are not rigidly connected to each other, the stresses required for an operation may be substantially less than those developed in the thermomotive elements shown in Figure 1.

Although the invention has been described with reference to certain specific embodiments thereof, numerous modifications are possible. All modifications falling within the spirit and scope of the invention are intended to be covered by the appended claims.

We claim as our invention:

1. In a thermally-responsive device, a first pair of thermomotive elements disposed in parallel, side-by-side relationship and electrically connected in series at adjacent ends thereof, a second pair of thermomotive elements disposed in parallel, side-by-side relationship and electrically connected in series at adjacent ends thereof, a support for the free ends of the thermomotive elements normally maintaining the elements in unstressed condition, whereby said pairs may be energized electrically through the free ends respectively in accordance with the sum and difference of two variable quantities, and means differentially responsive to the stresses developed in said pairs of thermomotive elements, said support comprising an electrical connection between one of the free ends of each of the pairs.

2. In a thermally-responsive device, a first pair of thermomotive elements disposed in parallel, side-by-side relationship and electrically connected in series at adjacent ends thereof, a second pair of thermomotive elements disposed in parallel, side-by-side relationship and electrically connected in series at adjacent ends thereof, a support for the free ends of the thermomotive elements normally maintaining the elements in unstressed condition, whereby said pairs may be energized electrically through the free ends respectively in accordance with the sum and difference of two variable quantities, and insulating means mechanically connecting the series-connected ends of the thermomotive elements for movement as a unit relative to the support, said support comprising an electrical connection between one of the free ends of each of the pairs.

3. In a thermally-responsive device, a first pair of thermomotive elements disposed in parallel, side-by-side relationship and electrically and mechanically connected in series at adjacent ends thereof, a second pair of thermomotive elements disposed in parallel, side-by-side relationship and electrically and mechanically connected in series at adjacent ends thereof, a support for the free ends of the thermomotive elements, whereby said pairs may be energized electrically through the free ends respectively in accordance with the sum and difference of two variable quantities, and means responsive to relative movement between the pairs of thermomotive elements at the series-connected ends thereof, said four elements being substantially in a common plane when deenergized.

4. In a thermally-responsive device, a support, four thermomotive multi-metallic elements disposed in parallel, side-by-side relationship substantially in a common plane and having adjacent ends mechanically secured to the support, first means electrically connecting the free ends of the inner multi-metallic elements, second means electrically connecting the free ends of the outer multi-metallic elements, and means differentially responsive to the forces tending to deflect the first and second means relative to the support.

5. In a thermally-responsive device, a support, four thermomotive multi-metallic elements disposed in parallel, side-by-side relationship substantially in a common plane and having adjacent ends mechanically secured to the support, first means electrically connecting the free ends of the inner multi-metallic elements, second means electrically connecting the free ends of the outer multi-metallic elements, said inner multi-metallic elements and said outer multi-metallic elements tending to deflect in opposite directions out of said plane in response to an increase in temperature thereof, and insulating means securing the free ends of the multi-metallic elements for movement as a unit relative to said adjacent ends.

6. In a thermally-responsive device, a support, four thermomotive multi-metallic elements disposed in parallel, side-by-side relationship substantially in a common plane and having adjacent ends mechanically secured to the support, first means electrically connecting the free ends of a first pair of the multi-metallic elements, second means electrically connecting the free ends of a second pair of the multi-metallic elements, said multi-metallic elements being disposed for deflection in the same direction out of said plane in response to an increase in temperature thereof, and translating means responsive to relative deflection occurring between said pairs of multi-metallic elements.

7. In a thermally-responsive device, four parallel side-by-side electroresponsive thermomotive elements extending between first and second spaced stations substantially in a common plane, a connection at the first station for connecting a first pair of the elements electrically in series, a connection at the first station for connecting a second pair of the elements electrically in series, said pairs being electrically and mechanically spaced from each other, a connection at the second station for electrically connecting one element in each of said pairs to each other, a mechanical support at the second station for the four elements, and a translating device differentially responsive to the outputs of the pairs of thermomotive elements.

8. In a thermally-responsive device, four parallel side-by-side electroresponsive thermomotive elements extending between first and second spaced stations substantially in a common plane, a connection at the first station for connecting a first pair of the elements electrically in series, a connection at the first station for connecting a second pair of the elements electrically in series, a mechanical support at the second station for the four elements, circuit connections connected to the pairs at the second station for directing a first current component in series through the pairs of elements, said circuit connections being effective for directing a second current component in parallel through the pairs of elements, whereby the pairs are energized in operation in accordance respectively with the sum and difference of the current components, and a translating device differentially responsive to the outputs of the pairs of elements.

KIRK A. OPLINGER.
STEPHEN SENTIPAL.

REFERENCES CITED

The following references are of record in the file of this patent:

UNITED STATES PATENTS

| Number | Name | Date |
|---|---|---|
| 1,831,558 | Hall | Nov. 10, 1931 |
| 2,055,705 | Prinz | Sept. 29, 1936 |
| 2,112,047 | Rick | Mar. 22, 1938 |
| 2,225,975 | Bruce | Dec. 24, 1940 |
| 2,284,383 | Elmer | May 26, 1942 |
| 2,306,810 | Jones | Dec. 29, 1942 |

FOREIGN PATENTS

| Number | Country | Date |
|---|---|---|
| 594,744 | Germany | Mar. 21, 1934 |